Feb. 17, 1931. J. D. NEULS 1,792,860
METHOD OF APPLYING INSECTICIDES TO VEGETABLE MATTER
Filed March 16, 1929
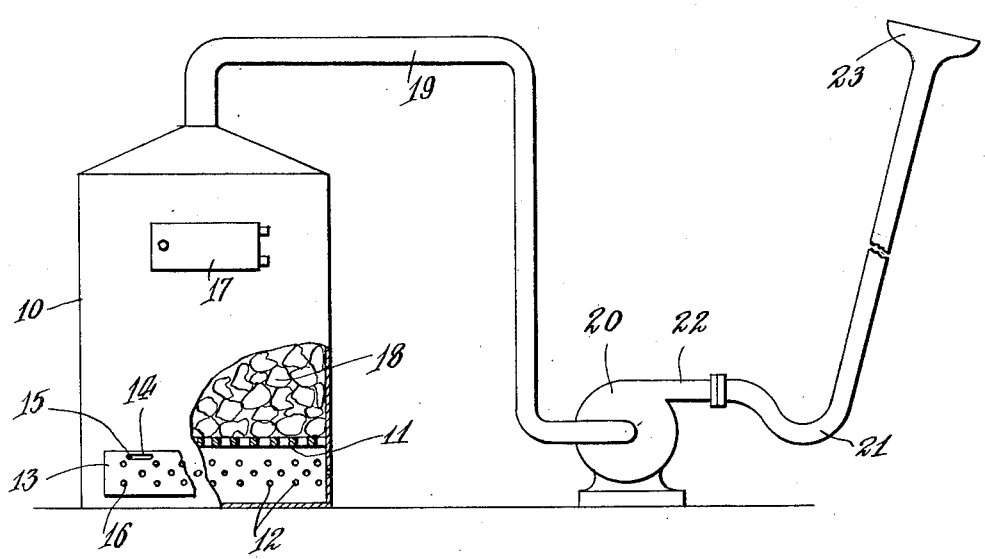
Inventor
Joseph D. Neuls
By Lyon+Lyon
Attorneys Patented Feb. 17, 1931

1,792,860

UNITED STATES PATENT OFFICE

JOSEPH D. NEULS, OF WHITTIER, CALIFORNIA

METHOD OF APPLYING INSECTICIDES TO VEGETABLE MATTER

Application filed March 16, 1929. Serial No. 347,526.

This invention relates to a method of applying insecticides, fungicides and other toxic agents to growing vegetable matter and other materials which may be benefited by the application of such insecticides, fungicides and the like. More particularly the invention relates to a method of extracting elements having toxic and insecticidal properties from oils, and other volatile insecticides and to a method of applying such extracted constituents to vegetable growing matter.

Oily materials have been employed for some time as insecticides and fungicides. For example, oil and oil containing materials have been used for years in the form of emulsions. All of these oils and oil containing materials have been employed in liquid form and depend upon contact between the insecticides and the insect, fungus or scale to be killed. In order to produce this contact between the insect or scale and the oil, the liquid compounds such as oil emulsions have been reduced to the form of fine sprays and applied to the vegetable matter in this form. It is almost impossible to efficiently spray a composition containing or composed of oil in any large quantity, and for this reason oily insecticides are emulsified in order to enable the oil to be thus delivered with water and applied with spray machinery.

Thorough contact between liquid insecticides and fungicides and insects or scales is hard to attain, as mechanical difficulties of distribution are great. For example, no matter how fine a spray is produced by the spraying machine, it is almost impossible to cause the spray to be delivered from a suitable nozzle in such manner as to break through heavy foliage on trees for example, and come in contact with insects and scales on the inner branches of the tree. Sprays are easily deflected by leaves and branches on the exterior of the tree, and for this reason the central or internal parts of a bush or tree are seldom adequately reached by insecticides when applied in this form.

An object of this invention is to disclose and provide a method of applying insecticides and fungicides whereby all portions of growing vegetable matter may come into thorough contact with the insecticide.

Another object is to disclose and provide a method whereby liquid insecticides and fungicides may be applied to growing vegetable matter without reducing such insecticides to the form of a spray.

Another object of this invention is to provide a method whereby oils normally in liquid form may be applied to growing vegetable matter without emulsification of such oils.

A still further object of this invention is to disclose and provide a method whereby crude, unrefined oils containing constituents dangerous to plant growth and highly toxic to insects may be applied to vegetable matter without injuring such vegetable matter.

A still further object of this invention is to disclose and provide a method of applying insecticides and fungicides, normally in liquid form, in the form of a vapor to a vegetable growth, the vaporized constituents then condensing upon intimate portions of the vegetable growth.

Petroleum or mineral oils in their natural state contain unsaturated hydrocarbons which are highly toxic to insects, but also dangerous to plants. It has been impossible to use such crude oils as insecticides and fungicides as plant growth is greatly retarded, if not destroyed, when such oils are used. Consequently, petroleum and mineral oils have been refined before use as insecticides and in the refinement of these oils the quantity of unsaturated hydrocarbon is materially reduced. In refining the oils to a degree of safety required by the host plants the toxic compounds are simultaneously reduced to a point where they are of little effect against certain types of insects.

It has been possible to use oils of pronounced toxicity provided such oils are very volatile and leave the plant to which they have been applied quickly. Such oils are effective against insects which are unarmored, but are of little avail against armored insects. The more highly refined oils, that is oils which are less volatile, depend primarily upon their "smothering" properties to affect the insect, and these latter oils are more effective against the armored scales and insects which have more than one annual generation.

Unfortunately, the highly refined, heavier and less volatile oils have been found to have more various physiological effects upon plants, the damage not being apparent until weeks after treatment. As a result of these experiences, the present trend of the art is toward a highly refined oil of medium volatility, to which a toxic compound such as alkaloid is added to compensate for the toxicity lost during the refining process of the oil. The use of these highly refined oils in combination with toxic compounds and alkaloids greatly increases the cost of properly controlling insects and scales.

As has been stated before, the oil containing insecticides and fungicides have been heretofore applied in the form of spray to plants. In accordance with the process embraced by my invention, the oils or oily materials are applied in the form of a vapor which more thoroughly impregnates bushes, trees and other dense growing vegetable matter and intimately comes in contact with all portions of the plants.

It is to be understood that numerous materials may be employed in carrying out the method disclosed herein, but for purposes of illustration reference will be had to the application of a mineral oil containing toxic compounds of insecticidal value.

In describing the invention in detail reference will be had to the appended drawing, in which one form of apparatus adapted to be used in carrying out the method is shown.

In carrying out my process any combustible material impregnated with a combustible oil or an oil which is liquid under normal conditions of temperature and pressure may be employed. The carrier material may be either organic or inorganic. For example, saw-dust may be used as a carrier for the oil, such saw-dust being burned or charred during the process of vaporizing the oil. Instead of using an organic material such as saw-dust an inorganic material such as, for example, porous blocks of ceramic material or natural inorganic material such as pumice or diatomaceous earth, shale or the like may be employed.

The insecticide and fungicide may consist of any oily material, liquid at normal temperatures, or it may consist of a solid capable of being vaporized or sublimated. As an example of the latter class, I may use paradichlorbenzene. In all instances, however, the insecticide is mixed with or absorbed upon a porous carrier such as, for example, the organic or inorganic carriers mentioned hereinabove, and preferably the carriers when moistened with a small percentage of water so as to retard the return of combustion.

When an inorganic material impregnated with a mineral oil is used in my process, for example when an oil shale is employed, the shale may be moistened with about ten per cent, by weight, of water. It is to be understood that the use of water in this step of the process is not essential, but is dependent upon the character of the carrier employed and of the rate at which the oil contained in the carrier is vaporized during the subsequent steps of the process.

Instead of water one or more suitable volatile insecticides or insecticidal compounds may be employed.

The carrier containing the oil having insecticidal properties or constituents is then subjected to an incomplete combustion and the fumes or vapors generated during said combustion are preferably blown against or directed onto the vegetable growing matter which it is desired to rid of insects and scales. The oils, oily compounds or insecticidal constituents present in such oils are thus reduced to a vapor, caused to contact with, enter into and permeate the foliage of trees, shrubs and the like, thereby coming into direct contact with insects and scales at all points of the bush or tree.

The apparatus shown on the appended drawing may be employed to good advantage in generating and distributing the insecticide in the form of vapor. Referring to the drawing, the apparatus may consist of a generator 10 which may be a portable, upright, cylindrical furnace provided with a grating 11 near the bottom thereof, and with air inlets or perforations 12 below such grating 11. Means for controlling the number of apertures 12 in direct communication between the interior and outside air may be controlled by means of dampers or closures. For example, the perforations 12 may be adjustably closed or opened by means of closure plates 13 attached exteriorly of the generator 10 and provided with slotted openings 14 cooperating with a pin or pins 15 attached to the generator 10.

The closure members 13 are preferably provided with apertures 16 adapted to coincide with apertures 12 made in the generator 10. By sliding the closure member 13 the openings 12 and 16 may be caused to coincide or assume a staggered relation whereby the total area of air inlets is materially reduced or completely eliminated.

The generator 10 may also be provided with means for feeding the same with the carrier material impregnated with the oil or oily compound which it is desired to apply to the vegetable matter. For example, the generator 10 may be provided with a hinged door 17 in the upper portion of said generator, through which the carrier material 18 may be inserted. A chimney or outlet pipe 19 is preferably connected with the upper portion of the generator 10, said outlet pipe 19 leading to the suction inlet of a suitable fan or blower 20 (driven by any suitable means, not shown). A flexible hose or pipe 21 is then preferably connected to the exhaust outlet 22 of the fan or blower 20, the flexible pipe or hose 21 terminating, if desired, in a suitable nozzle such as the flat fish-tail nozzle 23.

In carrying out my process the oil impregnated material 18 is placed within the generator 10, the suction fan 20 is started, and the oil impregnated carrier material is ignited at the bottom of the generator. Sufficient air is drawn through the ports 12 so as to maintain a partial or incomplete combustion of the material 18 within the generator 10. As such material burns the oily constituents of the material are vaporized and partially cracked.

In addition, moisture inherently present in the carrier material, or water which had been added thereto, is also vaporized, and all of these vapors of oil, water or other volatile substances present in the carrier material pass through the outlet pipe 19 and are discharged by the fan 20 into the tube or hose 21. Such vapors are thence blown through the nozzle 23 onto the host plant where the vapors permeate the plant thoroughly and condense on the foliage.

The vapor produced in accordance with this process is of the appearance and consistency of smoke.

Again certain types of armored scales and insects it may be advisable to use a covering such as is used in fumigation, over the plants.

The apparatus illustrated on the attached drawings may be either stationary or, obviously, it may be mounted on any movable base for transporting the same through an orchard or cultivated tract which it is desired to rid of insects, for example the apparatus may be carried by aircraft and the vapors applied from above.

Inasmuch as the lighter and more volatile constituents of mineral oils exert the greatest toxic affect upon insects, it is unnecessary, and it may be undesirable, to completely vaporize all of the constituents of carriers impregnated with heavy mineral oils. For example, when oil shale is the material employed in the generator 10, a condenser may be installed in the pipe line 19 or 21, said condenser being adapted to remove the heavy fractions of oil vaporized in the generator 10.

A condenser of this character, however, should not condense or remove the vapors of the lighter, more volatile and more toxic fractions.

It is to be understood that, if desired, dusting, fumigating and other materials and methods of known character may be employed conjointly with or in addition to the method described herein. For example insecticidal and fungicidal dusting materials such as calcium cyanide may be distributed with great effectiveness at the same time that the vaporized toxic constituents are being applied by my process by introducing such dust, in desired quantity, into the discharge lines 22 or 21 of the apparatus described hereinabove.

The uses and advantages of the process embraced by my invention are apparent from the hereinabove detailed description. It is to be understood that I am not to be limited to the use of the particular materials specifically mentioned herein, as any oil or oily insecticide, or as a matter of fact, any insecticide or fungicide capable of being vaporized may be employed in carrying out my process.

There are a multitude of substances and compositions which may be employed in my process, and the voluminous prior art is referred to for these substances in detail.

The invention is not limited, therefore, to the specific material disclosed herein, but embraces all the modifications and changes which come within the scope of the appended claims.

I claim:

1. In a method of applying insecticides and fungicides the steps of subjecting a porous carrier impregnated with a mineral oil to a simultaneous distillation and incomplete combustion, and bringing the vapors generated by such distillation and incomplete combustion into intimate contact with insects and scales.

2. In a method of applying insecticides and fungicides to vegetable growths the steps of impregnating a porous carrier with a liquid containing mineral oil, subjecting said carrier to a simultaneous distillation and incomplete combustion, and bringing the vapors generated by such distillation and incomplete combustion into intimate contact with vegetable growths infested with insects and scales.

3. In a method of applying insecticides to vegetable growths, the steps of impregnating a porous carrier with a liquid containing mineral oil, moistening said impregnated carrier with an aqueous liquid, subjecting said moistened impregnated carrier to incomplete combustion, and bringing vapors generated by such incomplete combustion in contact with vegetable growths.

4. In a method of applying insecticides, the steps of impregnating a porous combustible carrier with a liquid containing mineral oil, subjecting said carrier to incomplete combustion, and bringing the vapors generated by such incomplete combustion into intimate contact with vegetable growths infested with insects and scales.

5. A method of applying insecticides and fungicides to vegetable growths, comprising subjecting mineral oil to a simultaneous distillation and incomplete combustion, and then bringing the vapors generated by such distillation and incomplete combustion into intimate contact with vegetable growths infested with insects and scales.

6. In a method of applying insecticides and fungicides, the steps of subjecting an insecticide, normally in liquid state, to a simultaneous distillation and incomplete combustion, and then bringing the vapors generated by such distillation and incomplete combustion into intimate contact with vegetable growths infested with insects and scales.

7. In a method of applying insecticides and fungicides, the steps of subjecting a porous carrier containing a liquid insecticide and fungicide absorbed therein to a simultaneous distillation and incomplete combustion, and bringing the vapors generated by such distillation and incomplete combustion into intimate contact with insects and scales.

Signed at Los Angeles, Cal., this 5th day of March, 1929.

JOSEPH D. NEULS.